(12) United States Patent
Kim

(10) Patent No.: US 12,420,781 B2
(45) Date of Patent: Sep. 23, 2025

(54) APPARATUS AND METHOD FOR CONTROLLING VEHICLE

(71) Applicants: Hyundai Motor Company, Seoul (KR); Kia Corporation, Seoul (KR)

(72) Inventor: Dong Hyuk Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 166 days.

(21) Appl. No.: 18/351,197

(22) Filed: Jul. 12, 2023

(65) Prior Publication Data

US 2024/0190419 A1  Jun. 13, 2024

(30) Foreign Application Priority Data

Dec. 8, 2022  (KR) .......................... 10-2022-0170725

(51) Int. Cl.
*B60W 30/08* (2012.01)
*B60W 30/09* (2012.01)
*B60W 30/095* (2012.01)
*B60W 30/12* (2020.01)
*B60W 30/18* (2012.01)
*B60W 40/02* (2006.01)

(52) U.S. Cl.
CPC ........ *B60W 30/09* (2013.01); *B60W 30/0956* (2013.01); *B60W 30/18163* (2013.01); *B60W 2554/4041* (2020.02)

(58) Field of Classification Search
CPC ............ B60W 30/09; B60W 30/0956; B60W 30/18163; B60W 2554/4041; B60W 30/08; B60W 30/12; B60W 40/02; B60W 2552/50; B60W 2720/106; B60Y 2300/08; B60Y 2300/12
USPC .......................................................... 701/301
See application file for complete search history.

(56) References Cited

U.S. PATENT DOCUMENTS

| | | | |
|---|---|---|---|
| 2018/0043890 A1* | 2/2018 | Keller | B60W 30/08 |
| 2018/0348752 A1* | 12/2018 | Sakamoto | G05D 1/0055 |
| 2019/0193726 A1* | 6/2019 | Ishikawa | B60Q 1/44 |
| 2019/0270448 A1* | 9/2019 | Takasao | B60W 10/18 |
| 2021/0221367 A1* | 7/2021 | Hiramatsu | B60W 30/0956 |
| 2021/0394752 A1* | 12/2021 | Satoh | B60W 30/09 |
| 2023/0202479 A1* | 6/2023 | Horiguchi | B60W 30/18163 701/93 |

* cited by examiner

Primary Examiner — Rachid Bendidi
Assistant Examiner — Hossam M Abd El Latif
(74) Attorney, Agent, or Firm — Slater Matsil, LLP

(57) ABSTRACT

An embodiment vehicle control apparatus includes a sensor configured to obtain a location of an obstacle in a driving lane of a vehicle and a location of a rear vehicle driving in the driving lane and a controller configured to set an avoidance area within the driving lane based on a virtual line connecting the rear vehicle to the obstacle and to generate an avoidance route for the vehicle for avoiding the obstacle based on the avoidance area in response to a determination that it is not possible for the vehicle to change lanes to avoid the obstacle in the driving lane while a driving assistance function is activated.

20 Claims, 9 Drawing Sheets

APPARATUS AND METHOD FOR CONTROLLING VEHICLE

CROSS-REFERENCE TO RELATED APPLICATIONS

This application claims the benefit of Korean Patent Application No. 10-2022-0170725, filed on Dec. 8, 2022, which application is hereby incorporated herein by reference.

TECHNICAL FIELD

The present disclosure relates to an apparatus and method for controlling a vehicle.

BACKGROUND

An automated lane keeping system (ALKS) is applied to a vehicle, in which a driver is present and which is capable of driving at a predetermined speed (e.g., 60 km/h) that is the maximum speed, and thus controls driving forward, backward, left, and right on a highway. When the vehicle deviates from a driving lane, the ALKS may allow the vehicle to keep the driving lane by not only outputting a warning sound but also controlling a steering wheel.

In a state where an automated lane keeping function is activated, the vehicle is driving while keeping the driving lane. However, under autonomous driving rules, temporary lane departures are permitted by entering an adjacent lane to avoid an obstacle when the vehicle needs to avoid the obstacle because the obstacle is present on a road on which the vehicle is driving.

However, when the vehicle is incapable of avoiding an obstacle by changing to an adjacent lane, the vehicle still needs to avoid the obstacle while driving within the driving lane. At this time, because a rear vehicle driving behind the vehicle fails to recognize the obstacle in advance, the rear vehicle may rapidly decelerate or may change a lane to avoid the obstacle, resulting in an accident.

SUMMARY

Embodiments of the present disclosure can solve problems occurring in the prior art while advantages achieved by the prior art are maintained intact.

An embodiment of the present disclosure provides a vehicle control apparatus and method for generating an avoidance route for avoiding an obstacle on a road, on which a vehicle is driving, while a driving assistance function is activated.

An embodiment of the present disclosure provides a vehicle control apparatus and method for generating an avoidance route such that a rear vehicle driving on a road, on which the vehicle is driving, may recognize an obstacle, when it is difficult to avoid the obstacle through a lane change while the driving assistance function is activated.

An embodiment of the present disclosure provides a vehicle control apparatus and method for allowing the rear vehicle to avoid the obstacle through preemptive lane change or speed change by generating an avoidance route such that the rear vehicle recognizes an obstacle, when the avoidance route is generated to avoid the obstacle while a driving assistance function is activated.

An embodiment of the present disclosure provides a vehicle control apparatus and method for improving the driving stability of a vehicle by allowing a preceding vehicle to drive through the avoidance route generated to allow the rear vehicle to recognize the obstacle.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a vehicle control apparatus may include a sensor that obtains a location of an obstacle in a driving lane of a vehicle and a location of a rear vehicle driving on the driving lane and a controller that sets an avoidance area within the driving lane based on a virtual line connecting the rear vehicle to the obstacle and generates an avoidance route for avoiding the obstacle based on the avoidance area when it is impossible to change a lane for avoiding the obstacle of the driving lane while a driving assistance function is activated.

In an embodiment, the controller may generate the virtual line that connects a driver seat of the rear vehicle to a center point of the obstacle and has a predetermined width.

In an embodiment, the controller may set the avoidance area including a left avoidance area and a right avoidance area based on the virtual line within the driving lane and may set a drivable avoidance area based on the virtual line.

In an embodiment, the controller may set an area, in which the vehicle is capable of driving without overlapping the virtual line, as the drivable avoidance area.

In an embodiment, the controller may generate the avoidance route within the drivable avoidance area.

In an embodiment, the controller may preferentially generate a first avoidance route in the avoidance area in an opposite direction of the obstacle based on a center of the driving lane and may allow the vehicle to drive along the first avoidance route.

In an embodiment, the controller may generate a second avoidance route in the avoidance area in a direction of the obstacle and may allow the vehicle to drive along the second avoidance route when determining that it is impossible to generate the first avoidance route in the avoidance area in the opposite direction to the obstacle.

In an embodiment, the controller may allow the vehicle to stop within the driving lane when it is determined that the drivable avoidance area is not present.

In an embodiment, the controller may control acceleration or deceleration so as not to overlap the virtual line.

According to an embodiment of the present disclosure, a vehicle control method may include obtaining a location of an obstacle in a driving lane of a vehicle and a location of a rear vehicle driving on the driving lane and setting an avoidance area within the driving lane based on a virtual line connecting the rear vehicle to the obstacle and generating an avoidance route for avoiding the obstacle based on the avoidance area when it is impossible to change a lane for avoiding the obstacle of the driving lane while a driving assistance function is activated.

In an embodiment, the vehicle control method may further include generating the virtual line that connects a driver seat of the rear vehicle to a center point of the obstacle and has a predetermined width.

In an embodiment, the vehicle control method may further include setting the avoidance area including a left avoidance area and a right avoidance area based on the virtual line within the driving lane and setting a drivable avoidance area based on the virtual line.

In an embodiment, the vehicle control method may further include setting an area, in which the vehicle is capable of driving without overlapping the virtual line, as the drivable avoidance area.

In an embodiment, the vehicle control method may further include generating the avoidance route within the drivable avoidance area.

In an embodiment, the vehicle control method may further include preferentially generating a first avoidance route in the avoidance area in an opposite direction of the obstacle based on a center of the driving lane and allowing the vehicle to drive along the first avoidance route.

In an embodiment, the vehicle control method may further include generating a second avoidance route in the avoidance area in a direction of the obstacle and allowing the vehicle to drive along the second avoidance route when determining that it is impossible to generate the first avoidance route in the avoidance area in the opposite direction to the obstacle.

In an embodiment, the vehicle control method may further include allowing the vehicle to stop within the driving lane when it is determined that the drivable avoidance area is not present.

In an embodiment, the vehicle control method may further include controlling acceleration or deceleration so as not to overlap the virtual line.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
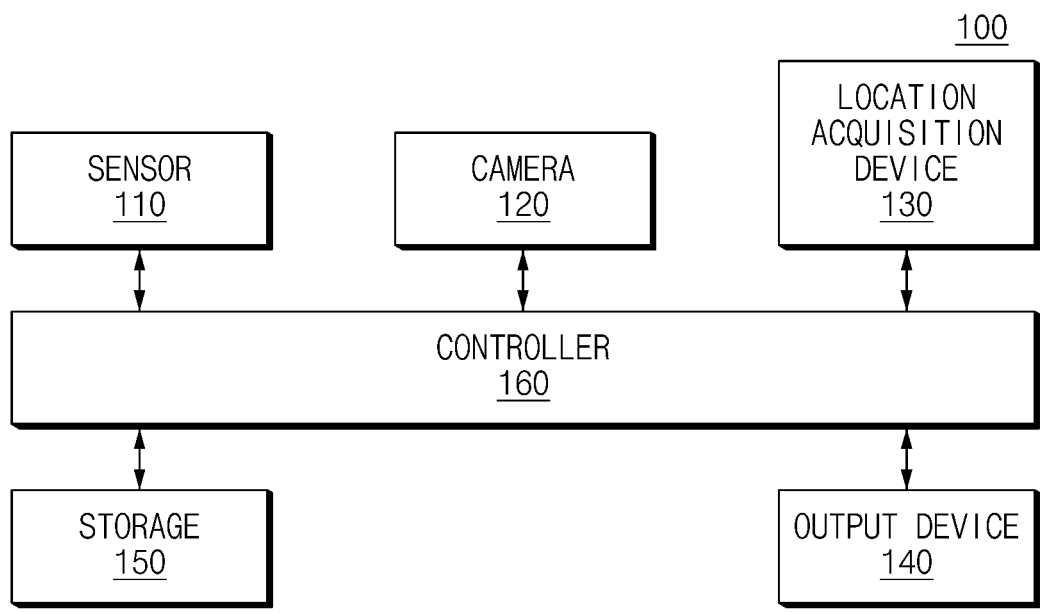
FIG. 1 is a diagram showing a vehicle control apparatus according to an embodiment of the present disclosure.

Hereinafter, some embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of the present disclosure unnecessarily obscure.

In describing elements of an embodiment of the present disclosure, the terms first, second, A, B, (a), (b), and the like may be used herein. These terms are only used to distinguish one element from another element but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a diagram showing a vehicle control apparatus according to an embodiment of the present disclosure.

As illustrated in FIG. 1, a vehicle control apparatus 100 according to an embodiment of the present disclosure may include a sensor 110, a camera 120, a location acquisition device 130, an output device 140, a storage (i.e., a memory) 150, and a controller 160. When there is no input such as a driver's driving operation, braking operation, or steering operation, an ALKS may control a vehicle to drive autonomously in a situation in which a condition regulated by laws is satisfied.

The sensor 110 may obtain a location of an obstacle on a driving lane and a location of a rear vehicle driving on the driving lane. According to an embodiment, the sensor 110 may detect an object (e.g., a preceding vehicle traveling in surroundings including the front, rear, left, and right sides of a vehicle, a rear vehicle traveling in surroundings including the front, rear, left, and right sides of a vehicle, a side vehicle traveling in surroundings including the front, rear, left, and right sides of a vehicle, a road, an obstacle (a stationary object) including a structure installed around the road, a vehicle approaching in the opposite lane, or the like) around a vehicle and may obtain a location thereof. Moreover, the sensor 110 may obtain data including ground information and lane information of a road by detecting a signal reflected from the lane marking of the road or the surface of the road. To this end, according to an embodiment, the sensor 110 may include at least one of radar, light detection and ranging (LiDAR), an image sensor, or any combination thereof.

According to an embodiment, the camera 120 may obtain an image of an object (e.g., a preceding vehicle traveling in surroundings including the front, rear, left, and right sides of a vehicle, a rear vehicle traveling in surroundings including the front, rear, left, and right sides of a vehicle, a side vehicle traveling in surroundings including the front, rear, left, and right sides of a vehicle, a road, an obstacle (a stationary object) including a structure installed around the road, a vehicle approaching in the opposite lane, or the like) around a vehicle. In addition, the camera 120 may obtain a ground image of a road or a lane image by capturing lane markings on the road or the surface of the road. To this end, according to an embodiment, the camera 120 may include a front camera, left and right cameras, and a rear camera.

The location acquisition device 130 may be equipped with a GPS receiving device to obtain vehicle location information. The location acquisition device 130 may provide a map image of a specific area based on the location of the vehicle by matching a map with the location of the vehicle in pre-stored map data and then may provide a route from a current location to a destination set by the driver. According to an embodiment, the location acquisition device 130 may match the location of the vehicle based on an advanced driver assistance system (ADAS)-based precision map that enables ADAS including ALKS to operate safely, The location acquisition device 130 may provide a movement history of a vehicle and a movement route to a destination based on the ADAS-based precision map of the vehicle.

The output device 140 may include a turn signal that is turned on under the control of the controller 160. The turn signal may include a left turn signal and a right turn signal. When a turn-on command is received depending on a driver's input or determination of the controller 160, at least one of a left turn signal, a right turn signal, or any combination thereof may be output in a blinking state depending on the turn-on command.

The storage 150 may store at least one algorithm for performing calculation or execution of various commands for an operation of a vehicle control apparatus according to an embodiment of the present disclosure. The storage 150 may include at least one storage medium of a flash memory, a hard disk, a memory card, a read-only memory (ROM), a random access memory (RAM), an electrically erasable programmable read only memory (EEPROM), a programmable read-only memory (PROM), a magnetic memory, a magnetic disk, or an optical disc.

The controller 160 may be implemented by various processing devices such as a microprocessor equipped with a semiconductor chip capable of performing or executing various commands and may control an operation of a vehicle control apparatus according to an embodiment of the present disclosure. The controller 160 may be electrically connected to the sensor 110, the camera 120, the location acquisition device 130, the output device 140, and the storage 150 through wired cables or various circuits to transmit electrical signals including control commands and may transmit and receive the electrical signals including control commands over a communication network including controller area network (CAN) communication.

When it is impossible to change a lane for avoiding an obstacle in a driving lane while a driving assistance function is activated, the controller 160 may set an avoidance area within the driving lane based on a virtual line connecting a rear vehicle to the obstacle and may generate an avoidance route for avoiding an obstacle based on the avoidance area. Here, a driving assistance function may be activated when there is a driver in a vehicle equipped with ALKS and the vehicle is driving at less than a predetermined speed (e.g., 60 km/h). The driving assistance function may include a function of keeping a lane or changing a lane by autonomously controlling driving in front, rear, left, and right directions. The more detailed description is given with reference to FIGS. 2 to 7.

FIGS. 2 to 7 are diagrams schematically illustrating a vehicle control operation according to an embodiment of the present disclosure.

Figure 2:
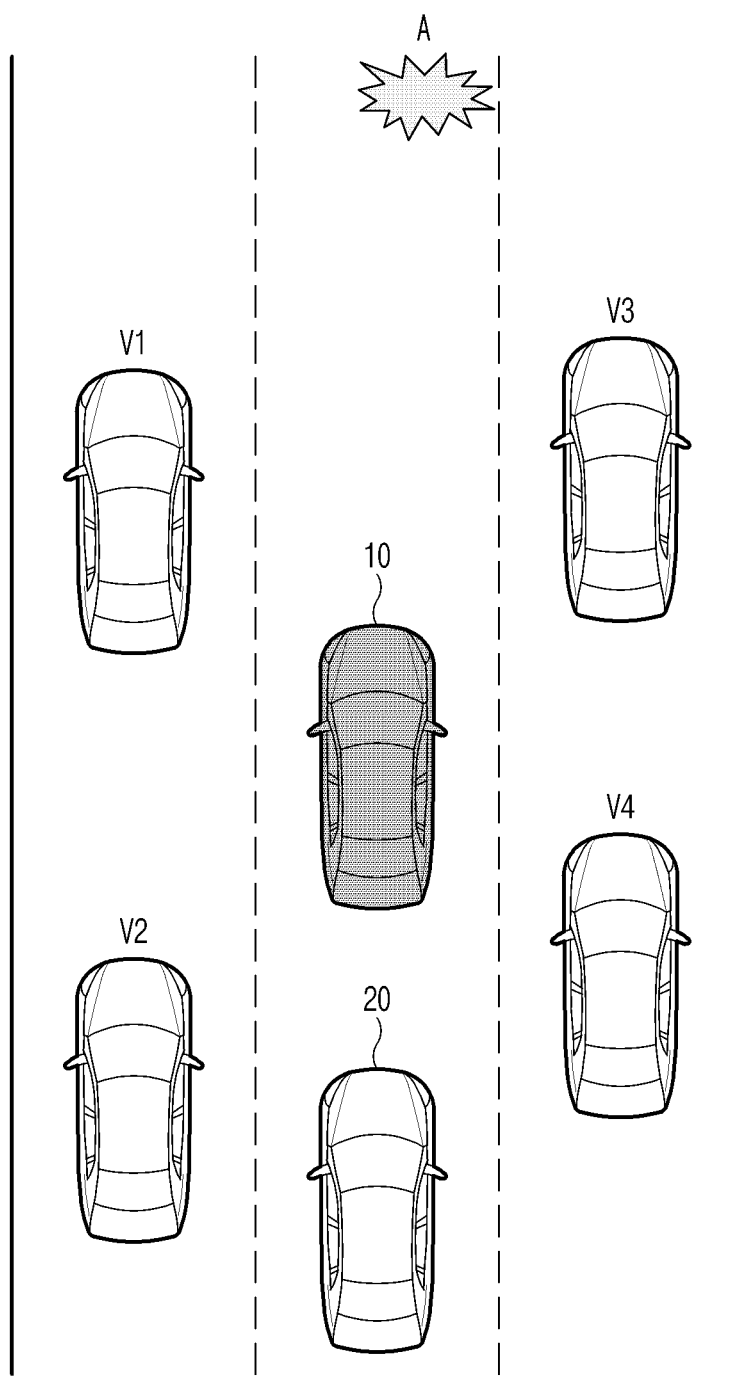
FIGS. 2 to 7 are diagrams schematically illustrating a vehicle control operation according to an embodiment of the present disclosure.

As shown in FIG. 2, the controller 160 may determine whether an obstacle 'A' is detected in a driving lane in which a vehicle 10 is driving. According to an embodiment, the controller 160 may determine whether the obstacle 'A' is detected in front of the vehicle 10.

In addition, the controller 160 may determine the location of a rear vehicle 20 driving in the rear of the driving lane in which the vehicle 10 is driving and a driver seat location of the rear vehicle 20. The controller 160 may determine the driver seat location of the rear vehicle 20 by using at least one of the sensor 110, the camera 120, or any combination thereof, or may determine the driver seat location of the rear vehicle 20 based on a country in which the vehicle 10 is driving. For example, when the country in which the vehicle 10 is driving is Japan, England, or Australia, the controller 160 may determine that the driver seat is located in a right seat. Moreover, the controller 160 may determine locations of vehicles V1, V2, V3, and V4 driving in a lane adjacent to a driving lane in which the vehicle 10 is driving.

Figure 3:
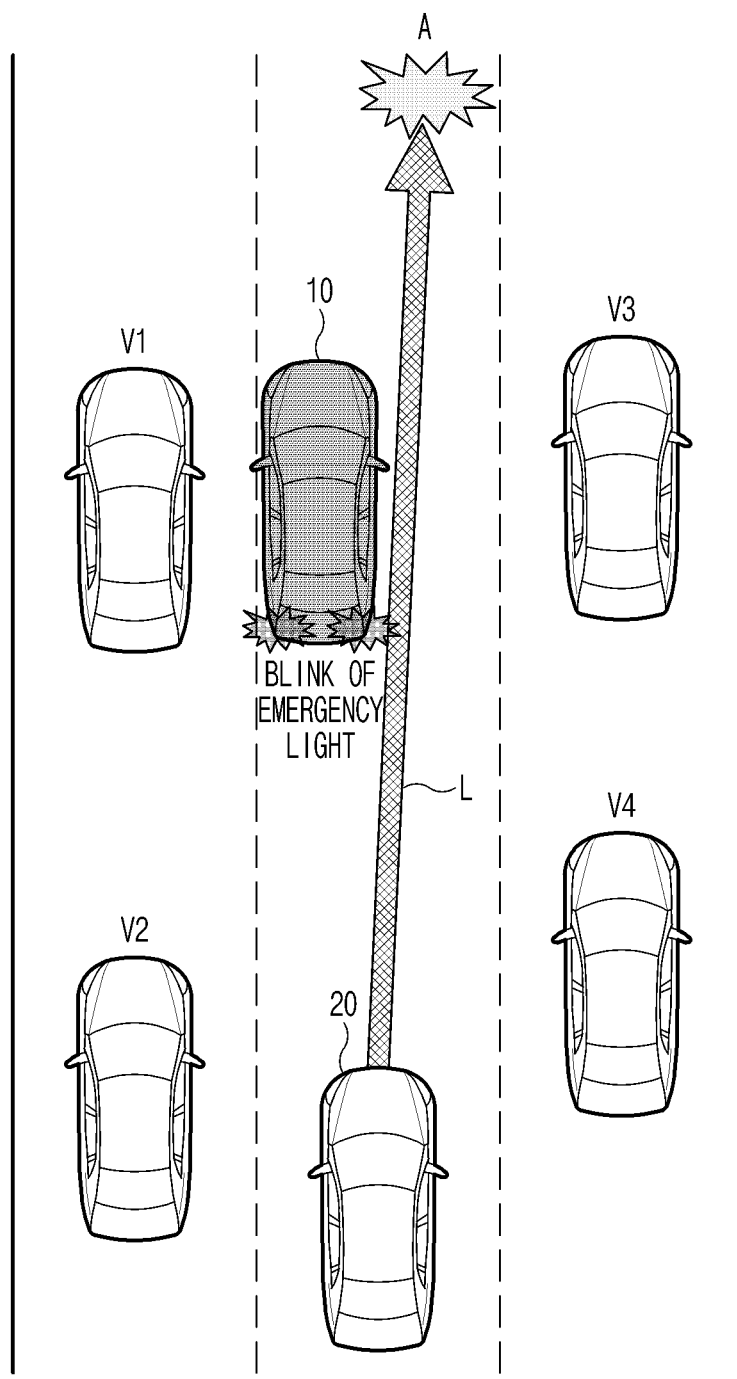

As illustrated in FIG. 3, the controller 160 may generate a virtual line 'L' connecting the obstacle 'A' to the rear vehicle 20. According to an embodiment, the controller 160 may generate the virtual line 'L' by connecting the driver seat of the rear vehicle 20 and the obstacle 'A'. The controller 160 may generate the virtual line 'L' to have a predetermined width. Here, it is understood that the predetermined width is a width of a passage through which a driver is capable of recognizing the obstacle 'A' at the driver seat of the rear vehicle 20. For example, the predetermined width may be set to 20 cm.

The controller 160 may set an avoidance area within the driving lane based on the virtual line 'L'. The controller 160 may set an area in which the vehicle 10 is capable of driving without overlapping the virtual line 'L' as a drivable avoidance area. When the drivable avoidance area is set, the controller 160 may allow an emergency light to blink and move to the drivable avoidance area. Detailed descriptions of generating an avoidance area will be given with reference to FIG. 5.

Figure 4:
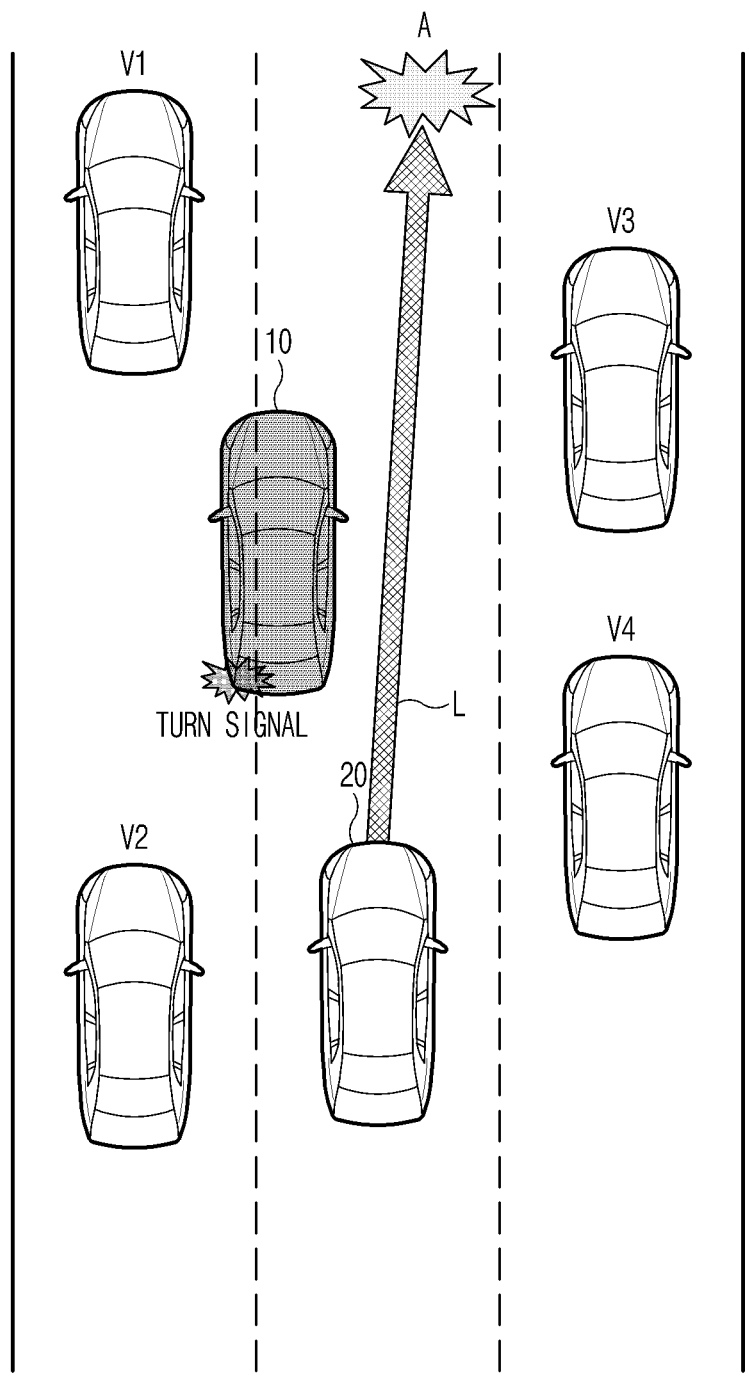

As shown in FIG. 4, when the vehicle 10 moves to the drivable avoidance area, the controller 160 may determine whether the vehicle 10 is capable of deviating from the driving lane, based on the locations of the vehicles V1, V2, V3, and V4 driving in a lane adjacent to the driving lane in which the vehicle 10 is driving. When determining that the vehicle 10 is capable of deviating from the driving lane, the controller 160 may allow a turn signal of a direction capable of deviating to blink and may permit departure from the driving lane to safely avoid the obstacle 'A'. However, when determining that the vehicle 10 is incapable of deviating from the driving lane, the controller 160 may set an avoidance route in the avoidance area in the driving lane and may allow the vehicle 10 to drive along an avoidance route. Detailed descriptions of an operation of driving along an avoidance route will be given with reference to FIGS. 6 and 7.

Figure 5:
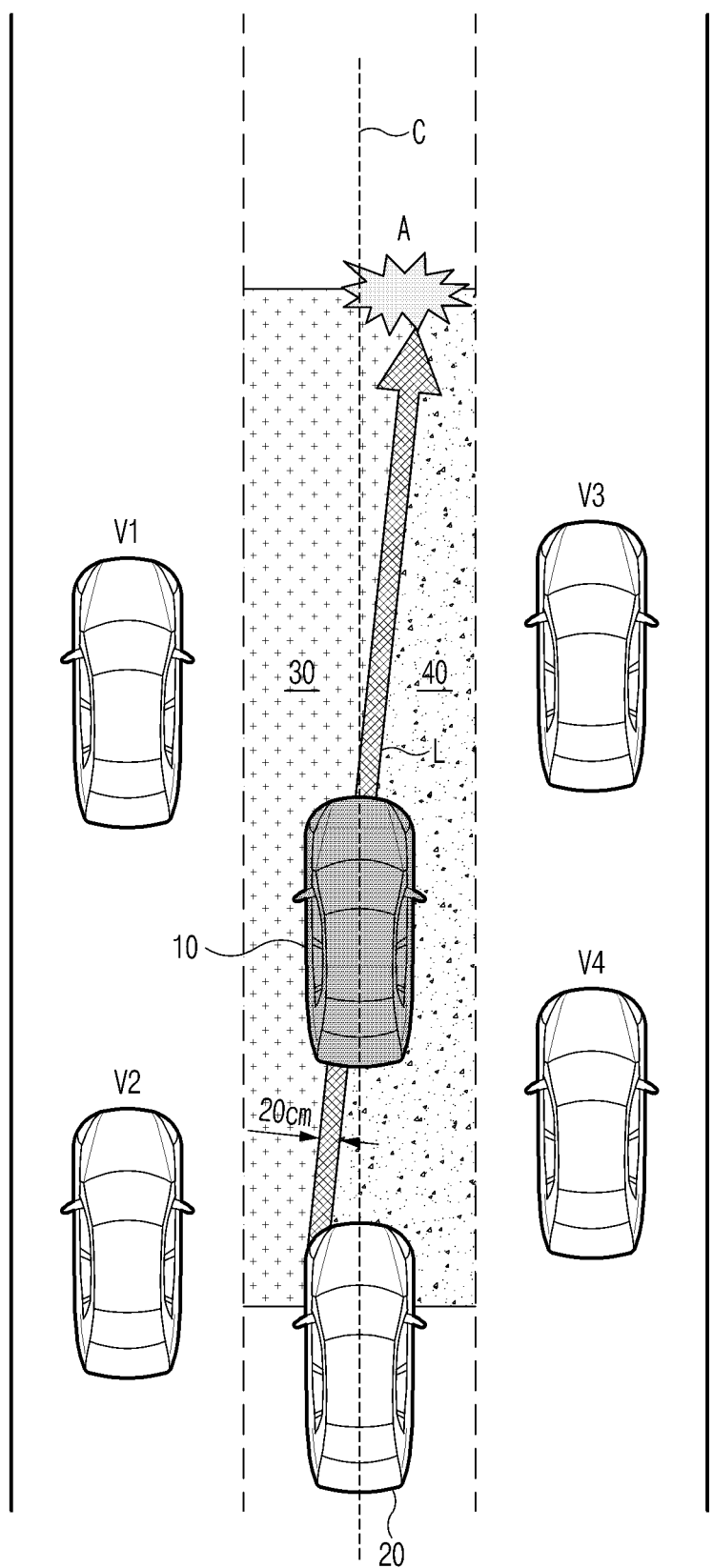

As shown in FIG. 5, the controller 160 may generate the virtual line 'L' connecting a driver seat of the rear vehicle 20 to a center point of the obstacle 'A' in a straight line. The controller 160 may generate the virtual line 'L' to have a predetermined width.

The controller 160 may set an avoidance area within the driving lane based on the virtual line 'L'. According to an embodiment, the controller 160 may set a left avoidance area 30 and a right avoidance area 40 in a driving lane based on the virtual line 'L'.

The controller 160 may determine whether the drivable avoidance area is present. According to an embodiment, the controller 160 may set an area in which the vehicle 10 is capable of driving without overlapping the virtual line 'L' as a drivable avoidance area and may determine whether the drivable avoidance area is present in at least one of the left avoidance area 30, the right avoidance area 40, or any combination thereof.

When determining that the drivable avoidance area is present in at least one of the left avoidance area 30, the right avoidance area 40, or any combination thereof, the controller 160 may generate an avoidance route in the drivable avoidance area.

According to an embodiment, the controller 160 may preferentially generate a first avoidance route in an avoidance area in a direction opposite to the obstacle 'A' based on the center 'C' of the driving lane and may allow the vehicle 10 to drive along the first avoidance route.

For example, when the obstacle 'A' is positioned on the right side of the center 'C' of the driving lane, and the drivable avoidance area is present in the left avoidance area 30 and the right avoidance area 40, the controller 160 may preferentially generate the first avoidance route in the left avoidance area 30 and may allow the vehicle 10 to drive along the first avoidance route. When it is possible to deviate from a driving lane or change lanes based on a location of another vehicle driving in a lane adjacent to a lane in which the vehicle 10 is driving while the vehicle 10 is driving along the first avoidance route, the controller 160 may allow the vehicle 10 to attempt to depart from a lane or change lanes for the purpose of avoiding the obstacle 'A'.

In the meantime, according to an embodiment, when determining that it is impossible to generate the first avoidance route in the avoidance area in the opposite direction to the obstacle 'A' based on the center 'C' of the driving lane, the controller 160 may create a second avoidance route in the avoidance area in the direction of the obstacle 'A' and may allow the vehicle 10 to drive along the second avoidance route.

For example, when determining that the obstacle 'A' is positioned on the right side of the center 'C' of the driving lane and the drivable avoidance area is present in the left avoidance area 30 and the right avoidance area 40, but it is impossible to generate the first avoidance route in the left avoidance area 30, the controller 160 may generate the second avoidance route in the right avoidance area 40 and may allow the vehicle 10 to drive along the second avoidance route. When it is possible to deviate from a driving lane or change lanes based on a location of another vehicle driving in a lane adjacent to a lane in which the vehicle 10 is driving while the vehicle 10 is driving along the second avoidance route, the controller 160 may allow the vehicle 10 to attempt to depart from a lane or change lanes for the purpose of avoiding the obstacle 'A'.

Figure 6:
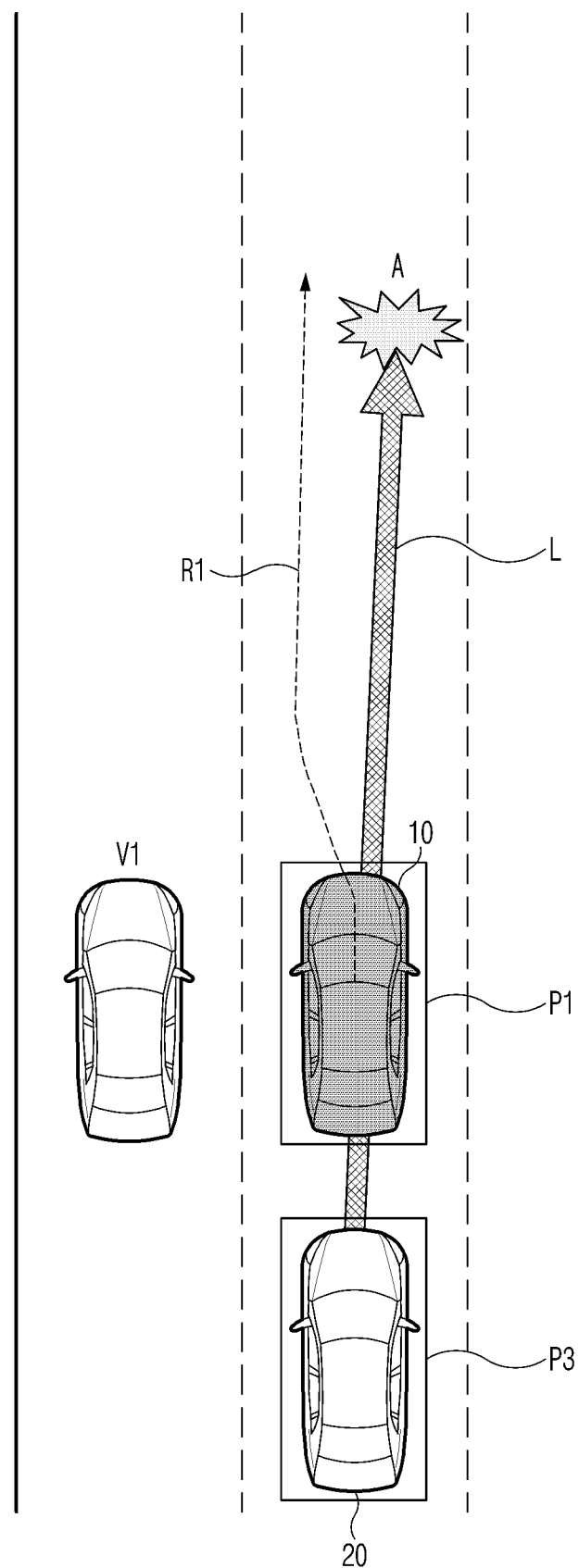

As shown in FIG. 6, the controller 160 may determine a location of the obstacle 'A' at the first location P1 of the vehicle 10. When the vehicle V1 is present in a lane adjacent to the driving lane, the controller 160 may determine that it is impossible to change lanes to avoid the obstacle 'A'.

Accordingly, the controller 160 may set an area in which the vehicle 10 is capable of driving without overlapping the virtual line 'L' connecting the rear vehicle 20 to the obstacle 'A' as a drivable avoidance area. Because it is impossible to change a lane due to the vehicle V1, the controller 160 may generate an avoidance route R1 within a driving lane.

When the avoidance route R1 is generated, the controller 160 may allow an emergency light to blink at the first location P1 and may allow the vehicle 10 to drive along the avoidance route R1. While the vehicle 10 is driving along the avoidance route R1, the controller 160 may control acceleration or deceleration so as not to overlap with the virtual line 'L'.

Figure 7:
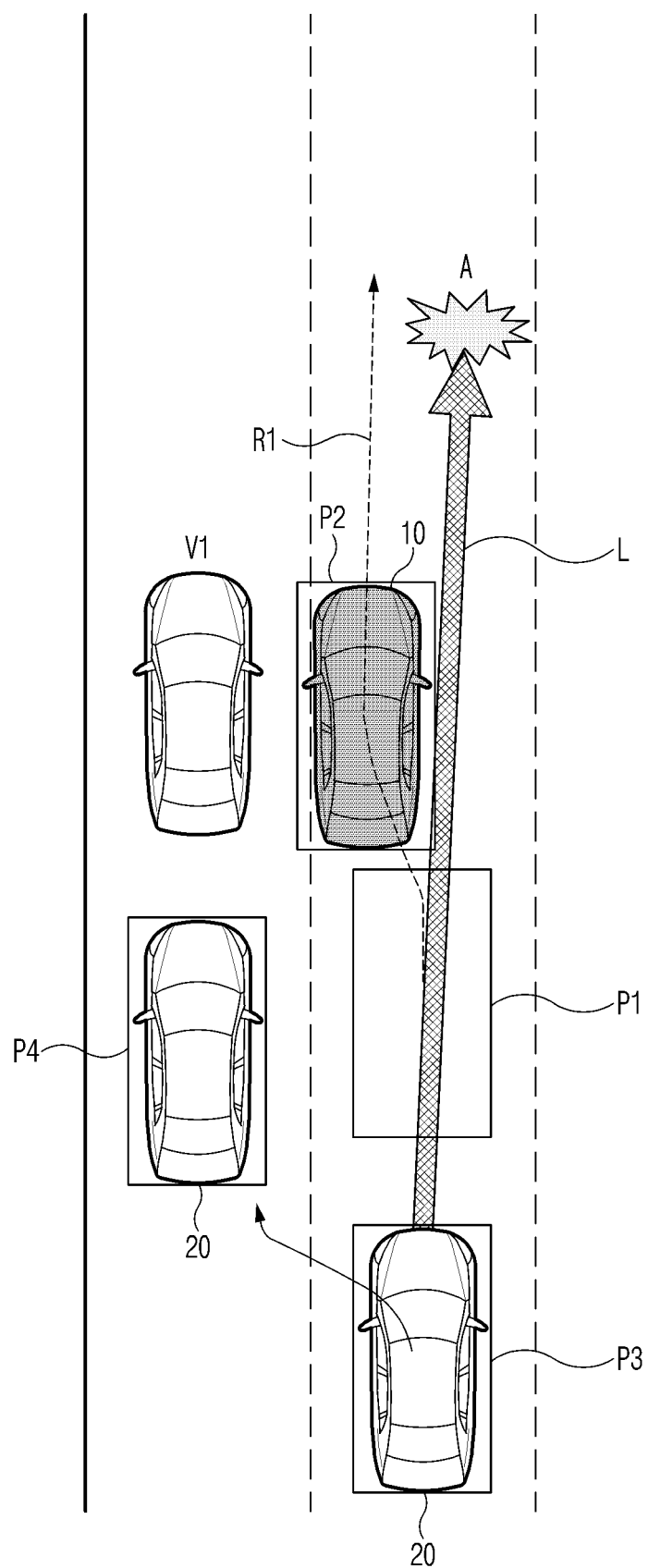

As shown in FIG. 7, when the vehicle 10 moves from the first location P1 to a second location P2 while driving along the avoidance route R1, the driver of the rear vehicle 20 may determine the location of the obstacle 'A'. As such, to avoid the obstacle 'A', the rear vehicle 20 may move to a fourth location P4 by changing a lane to a lane adjacent to a lane in which the rear vehicle 20 is driving at a third location P3 of the rear vehicle 20 or may change a vehicle speed. Accordingly, the rear vehicle 20 may preemptively prepare for the avoidance of the obstacle 'A'. Accordingly, the controller 160 may generate an avoidance route of the vehicle 10 through which a driver of the rear vehicle 20 is capable of quickly determining a location of the obstacle 'A', thereby allowing the rear vehicle 20 to drive safely.

Figure 8:
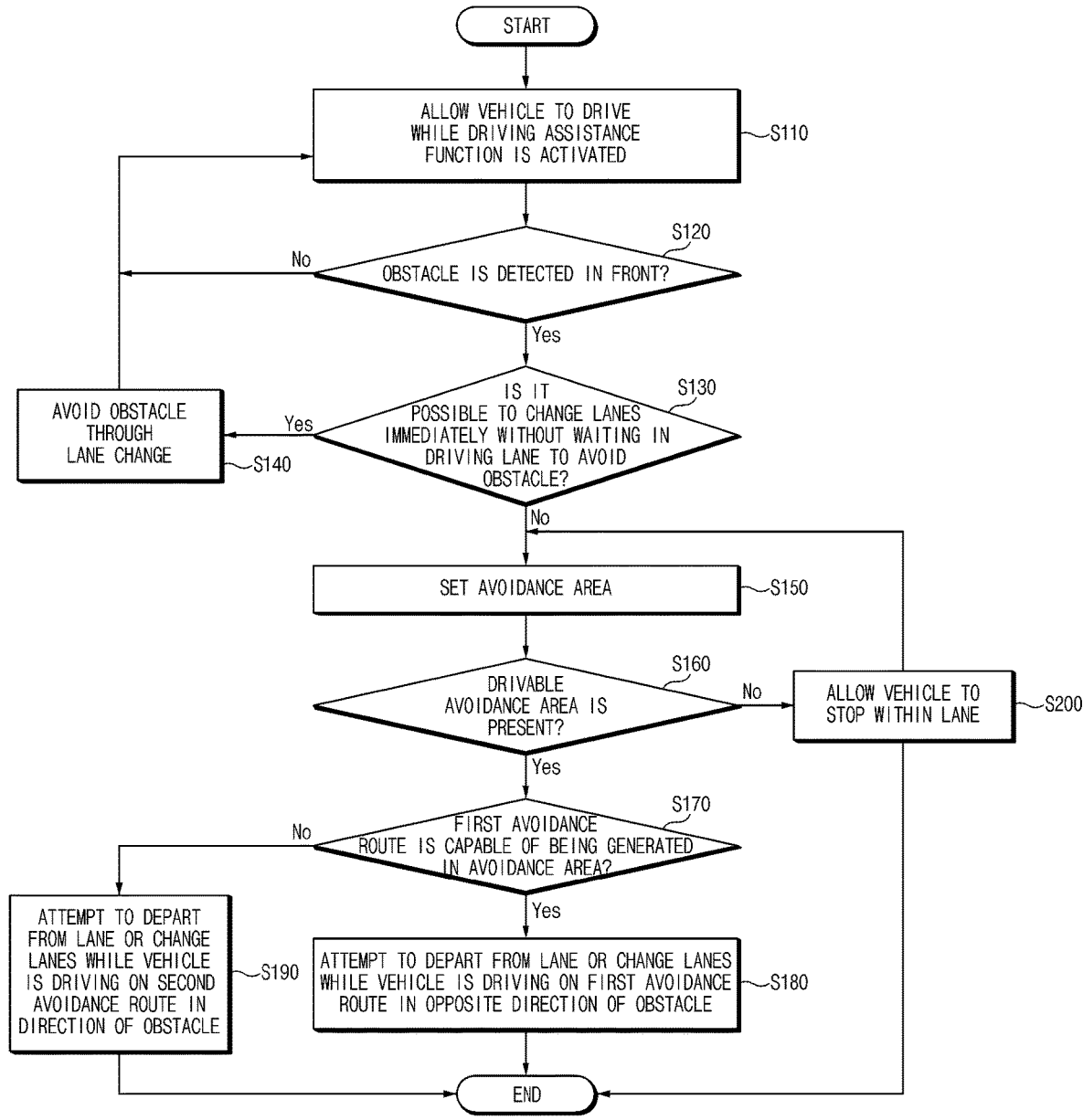
FIG. 8 is a diagram illustrating a vehicle control method according to an embodiment of the present disclosure.

FIG. 8 is a diagram illustrating a vehicle control method according to an embodiment of the present disclosure.

As illustrated in FIG. 8, the controller 160 may allow a vehicle to drive while a driving assistance function is activated (S110). Here, a driving assistance function may be activated when there is a driver in a vehicle equipped with ALKS and the vehicle is driving at less than a predetermined speed (e.g., 60 km/h). The driving assistance function may include a function of keeping a lane or changing a lane by autonomously controlling driving in front, rear, left, and right directions.

The controller 160 may determine whether an obstacle is detected in a driving lane in which a vehicle is driving. According to an embodiment, the controller 160 may determine whether the obstacle is detected in front of the vehicle (S120).

When determining that an obstacle is detected in front of the vehicle, the controller 160 may determine the location of another vehicle driving in a lane adjacent to the driving lane in which the vehicle is driving and may determine whether it is possible to change the lane to the lane adjacent to the driving lane to avoid the obstacle in front of the vehicle (S130).

When determining that it is possible to change lanes to avoid the obstacle, the controller 160 may immediately change the lane to the lane adjacent to the driving lane to avoid the obstacle (S140).

When determining that it is not possible to change the lane to the lane adjacent to the driving lane in S130, the controller 160 may set an avoidance area capable of avoiding the obstacle (S150).

According to an embodiment, in S150, the controller 160 may determine a location of a rear vehicle driving behind the driving lane in which the vehicle is driving and a driver seat location of the rear vehicle. The controller 160 may determine the driver seat location of the rear vehicle by using at least one of the sensor 110, the camera 120, or any combination thereof, or may determine the driver seat location of the rear vehicle based on a country in which the vehicle is driving. For example, when the country in which the vehicle is driving is Japan, England, or Australia, the controller 160 may determine that the driver seat is located in a right seat.

The controller 160 may generate a virtual line connecting the obstacle from the rear vehicle. According to an embodiment, the controller 160 may generate the virtual line by connecting the driver seat of the rear vehicle to the obstacle. The controller 160 may generate the virtual line to have a predetermined width. Here, it is understood that the predetermined width is a width of a passage through which a driver is capable of recognizing the obstacle at the driver seat of the rear vehicle. For example, the predetermined width may be set to 20 cm.

The controller 160 may set an avoidance area within the driving lane based on the virtual line. According to an embodiment, the controller 160 may set a left avoidance area and a right avoidance area in a driving lane based on the virtual line. Besides, the controller 160 may set an area, in which the vehicle is capable of driving without overlapping the virtual line, as a drivable avoidance area.

The controller 160 may determine whether the drivable avoidance area is present (S160).

In S160, the controller 160 may determine that the drivable avoidance area is present in at least one of the left avoidance area, the right avoidance area, or any combination thereof.

When determining that the drivable avoidance area is present in at least one of the left avoidance area, the right avoidance area, or any combination thereof, the controller 160 may determine whether a first avoidance route is capable of being preferentially generated in an avoidance area in the opposite direction of the obstacle based on the center of the driving lane (S170).

According to an embodiment, in S170, when the obstacle is positioned on the right side of the center of the driving lane and the drivable avoidance area is present in the left avoidance area and the right avoidance area, the controller 160 may determine whether the first avoidance route is preferentially generated in the left avoidance area.

When determining that the first avoidance route is capable of being preferentially generated in the left avoidance area, the controller 160 may allow the vehicle to drive along the first avoidance route. According to an embodiment, the controller 160 may allow the vehicle to drive along the first avoidance route and may control acceleration or deceleration so as not to overlap the virtual line. In addition, when it is possible to deviate from a driving lane or change lanes based on a location of another vehicle driving in a lane adjacent to the lane in which the vehicle is driving while the vehicle is driving along the first avoidance route, the controller 160 may allow the vehicle to attempt to depart from the lane or change lanes for the purpose of avoiding the obstacle (S180).

When determining that the first avoidance route is incapable of being preferentially generated in the left avoidance area, the controller 160 may generate a second avoidance route in an avoidance area in a direction of the obstacle and may allow the vehicle to drive along the second avoidance route. According to an embodiment, the controller 160 may allow the vehicle to drive along the second avoidance route and may control acceleration or deceleration so as not to overlap the virtual line.

For example, when determining that the obstacle 'A' is positioned on the right side of the center 'C' of the driving lane and the drivable avoidance area is present in the left avoidance area 30 and the right avoidance area 40, but it is impossible to generate the first avoidance route in the left avoidance area 30, the controller 160 may generate the second avoidance route in the right avoidance area 40 and may allow the vehicle 10 to drive along the second avoidance route. In addition, when it is possible to deviate from the driving lane or change lanes based on a location of another vehicle driving in a lane adjacent to the lane in which the vehicle is driving while the vehicle is driving on the second avoidance route, the controller 160 may allow the vehicle to attempt to depart from the lane or change lanes for the purpose of avoiding the obstacle (S190).

When determining that the drivable avoidance area is not present, the controller 160 may allow the vehicle to stop within the driving lane (S200).

Figure 9:
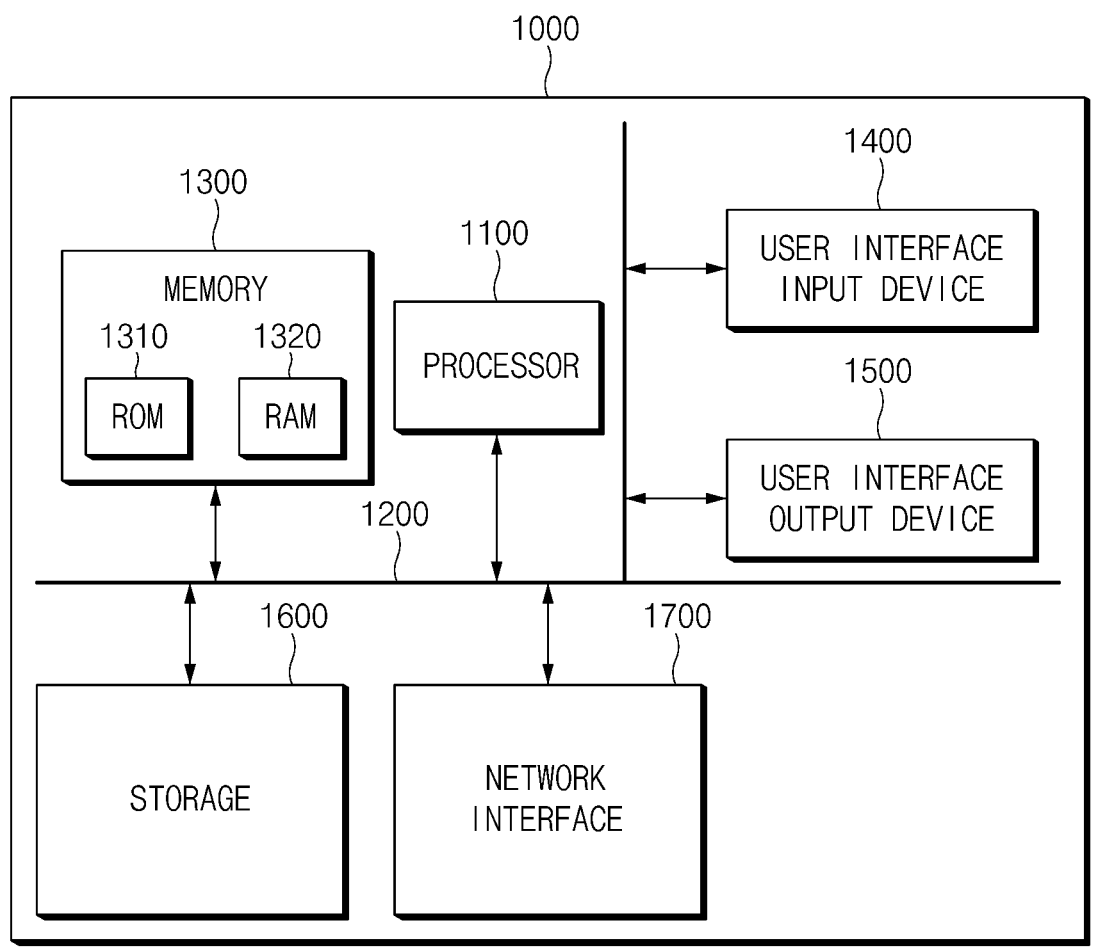
FIG. 9 is a block diagram illustrating a configuration of a computing system for performing a method according to an embodiment of the present disclosure.

FIG. 9 is a block diagram illustrating a configuration of a computing system for performing a method according to an embodiment of the present disclosure.

Referring to FIG. 9, a computing system 1000 may include at least one processor 1100, a memory 1300, a user interface input device 1400, a user interface output device 1500, a storage (i.e., a memory) 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of embodiments of the present disclosure, and various modifications and modifications may be made by one skilled in the art without departing from the essential characteristics of embodiments of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, a vehicle control apparatus and method may generate an avoidance route for avoiding an obstacle on a road on which a vehicle is driving while a driving assistance function is activated.

According to an embodiment of the present disclosure, a vehicle control apparatus and method may generate an avoidance route such that a rear vehicle driving on a road on which the vehicle is driving may recognize the obstacle when it is difficult to avoid the obstacle through a lane change while the driving assistance function is activated.

According to an embodiment of the present disclosure, a vehicle control apparatus and method may allow the rear vehicle to avoid the obstacle through a preemptive lane change or speed change by generating an avoidance route such that the rear vehicle recognizes the obstacle when the avoidance route is generated to avoid the obstacle while a driving assistance function is activated.

According to an embodiment of the present disclosure, a vehicle control apparatus and method may improve the driving stability of a vehicle by allowing a preceding vehicle to drive along the avoidance route generated to allow the rear vehicle to recognize the obstacle.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:
  at least one processor;
  memory storing instructions that, when executed by the at least one processor, cause the vehicle control apparatus to:

obtain a location of an obstacle in a driving lane of a vehicle and a location of a rear vehicle driving in the driving lane;

set an avoidance area within the driving lane based on a virtual line connecting the rear vehicle to the obstacle;

generate an avoidance route for the vehicle for avoiding the obstacle based on the avoidance area in response to a determination that it is not possible for the vehicle to change lanes to avoid the obstacle in the driving lane while a driving assistance function is activated; and control movement of the vehicle based on the avoidance route.

2. The vehicle control apparatus of claim 1, wherein the instructions cause the vehicle control apparatus to generate the virtual line connecting a driver seat of the rear vehicle to a center point of the obstacle, wherein the virtual line has a predetermined width.

3. The vehicle control apparatus of claim 2, wherein the instructions cause the vehicle control apparatus to set the avoidance area including a left avoidance area and a right avoidance area based on the virtual line within the driving lane and to set a drivable avoidance area based on the virtual line.

4. The vehicle control apparatus of claim 3, wherein the drivable avoidance area is an area in which the vehicle is capable of driving without overlapping the virtual line.

5. The vehicle control apparatus of claim 4, wherein the instructions cause the vehicle control apparatus to generate the avoidance route within the drivable avoidance area.

6. The vehicle control apparatus of claim 5, wherein the instructions cause the vehicle control apparatus to preferentially generate a first avoidance route in the avoidance area in an opposite direction of the obstacle based on a center of the driving lane and to allow the vehicle to drive along the first avoidance route.

7. The vehicle control apparatus of claim 6, wherein the instructions cause the vehicle control apparatus to generate a second avoidance route in the avoidance area in a direction of the obstacle and to allow the vehicle to drive along the second avoidance route in response to a determination that it is not possible to generate the first avoidance route in the avoidance area in the opposite direction of the obstacle.

8. The vehicle control apparatus of claim 4, wherein the instructions cause the vehicle control apparatus to allow the vehicle to stop within the driving lane in response to a determination that the drivable avoidance area is not present.

9. The vehicle control apparatus of claim 4, wherein the instructions cause the vehicle control apparatus to control acceleration or deceleration of the vehicle so as not to overlap the virtual line.

10. A vehicle control method, the method comprising:
obtaining a location of an obstacle in a driving lane of a vehicle and a location of a rear vehicle driving in the driving lane;
setting an avoidance area within the driving lane based on a virtual line connecting the rear vehicle to the obstacle;
generating an avoidance route for the vehicle to avoid the obstacle based on the avoidance area in response to a determination that it is not possible for the vehicle to change lanes to avoid the obstacle in the driving lane while a driving assistance function is activated; and
controlling movement of the vehicle based on the avoidance route.

11. The method of claim 10, wherein the virtual line connects a driver seat of the rear vehicle to a center point of the obstacle and has a predetermined width.

12. The method of claim 11, further comprising
setting the avoidance area including a left avoidance area and a right avoidance area based on the virtual line within the driving lane; and
setting a drivable avoidance area based on the virtual line.

13. The method of claim 12, wherein the drivable avoidance area is an area in which the vehicle is capable of driving without overlapping the virtual line.

14. The method of claim 13, further comprising generating the avoidance route within the drivable avoidance area.

15. The method of claim 14, further comprising:
preferentially generating a first avoidance route in the avoidance area in an opposite direction of the obstacle based on a center of the driving lane; and
allowing the vehicle to drive along the first avoidance route.

16. The method of claim 15, further comprising:
generating a second avoidance route in the avoidance area in a direction of the obstacle; and
allowing the vehicle to drive along the second avoidance route in response to a determination that it is not possible to generate the first avoidance route in the avoidance area in the opposite direction of the obstacle.

17. The method of claim 13, further comprising allowing the vehicle to stop within the driving lane in response to a determination that the drivable avoidance area is not present.

18. The method of claim 13, further comprising controlling acceleration or deceleration of the vehicle so as not to overlap the virtual line.

19. A vehicle control method, the method comprising:
allowing a vehicle to drive while a driving assistance function is activated;
obtaining a location of an obstacle in a driving lane of the vehicle and a location of a rear vehicle driving in the driving lane;
determining whether it is possible for the vehicle to move to an adjacent lane of the driving lane to avoid the obstacle;
in response to a determination that it is possible for the vehicle to move to the adjacent lane, allowing the vehicle to move to the adjacent lane;
in response to a determination that it is not possible for the vehicle to move to the adjacent lane, setting an avoidance area within the driving lane based on a virtual line connecting the rear vehicle to the obstacle;
determining whether a drivable avoidance area is present;
in response to a determination that the drivable avoidance area is present, generating an avoidance route in the avoidance area for the vehicle to travel along to avoid the obstacle; and
controlling the vehicle to follow the avoidance route.

20. The method of claim 19, further comprising, in response to a determination that the drivable avoidance area is not present, allowing the vehicle to stop within the driving lane.

* * * * *